United States Patent
White

(10) Patent No.: US 10,723,437 B2
(45) Date of Patent: Jul. 28, 2020

(54) SYSTEM FOR STRUCTURALLY INTEGRATED THERMAL MANAGEMENT FOR THIN WING AIRCRAFT CONTROL SURFACE ACTUATORS

(71) Applicant: The Boeing Company, Chicago, IL (US)

(72) Inventor: Edward V. White, St. Charles, MO (US)

(73) Assignee: The Boeing Company, Chicago, IL (US)

( * ) Notice: Subject to any disclaimer, the term of this patent is extended or adjusted under 35 U.S.C. 154(b) by 392 days.

(21) Appl. No.: 15/607,962

(22) Filed: May 30, 2017

(65) Prior Publication Data
US 2018/0346096 A1  Dec. 6, 2018

(51) Int. Cl.
*B32B 5/24* (2006.01)
*F28F 13/14* (2006.01)
(Continued)

(52) U.S. Cl.
CPC ............... *B64C 3/36* (2013.01); *B32B 5/245* (2013.01); *B64C 1/40* (2013.01); *B64D 13/006* (2013.01);
(Continued)

(58) Field of Classification Search
CPC ..... B64C 1/40; B64C 3/26; B64C 3/36; F28F 13/14; F28F 2013/001; B32B 5/02;
(Continued)

(56) References Cited

U.S. PATENT DOCUMENTS 4,283,464 A * 8/1981 Hascoe .................. F28F 13/14
165/185
4,416,349 A * 11/1983 Jacobs .................. G10K 11/16
181/208
(Continued)

FOREIGN PATENT DOCUMENTS

EP   2409914 A1   1/2012
FR   2937304 A1   4/2010
(Continued)

OTHER PUBLICATIONS

European Patent Office; Extended European Search Report for Application No. 18165160.5; dated Aug. 6, 2019.
(Continued)

*Primary Examiner* — Philip J Bonzell
*Assistant Examiner* — Tye William Abell
(74) *Attorney, Agent, or Firm* — Parsons Behle & Latimer

(57) ABSTRACT

A thermal management system for transferring heat from a heat load includes a first composite structural member that supports a heat load source, a second composite structural member, and a heat transfer member positioned between the first composite structural member and the second composite structural member and in thermal contact with at least the first composite structural member, and in thermal contact with a heat sink. The system further includes at least one thermally-conductive first fastener that is in thermal contact with the heat transfer member, couples the heat load source to at least the first composite structural member, and conducts heat from the heat load source into the heat transfer member. The heat transfer member conducts heat from the thermally-conductive first fastener to the heat sink.

20 Claims, 2 Drawing Sheets

(51) Int. Cl.
*B32B 5/02* (2006.01)
*F28F 13/00* (2006.01)
*B64C 3/36* (2006.01)
*B64G 1/50* (2006.01)
*B64C 1/40* (2006.01)
*B64D 13/00* (2006.01)
B64C 1/00 (2006.01)
B64C 3/26 (2006.01)
B64C 13/50 (2006.01)
B64C 9/00 (2006.01)
B64C 3/18 (2006.01)
B64C 1/38 (2006.01)

(52) U.S. Cl.
CPC .............. *B64G 1/50* (2013.01); *F28F 13/14* (2013.01); *B32B 5/02* (2013.01); *B64C 1/38* (2013.01); *B64C 3/18* (2013.01); *B64C 3/26* (2013.01); *B64C 9/00* (2013.01); *B64C 13/50* (2013.01); *B64C 2001/0072* (2013.01); *F28F 2013/001* (2013.01)

(58) Field of Classification Search
CPC ... B32B 5/245; H01L 23/467; H01L 23/4093; H01L 23/473; H01L 2023/405; H01L 2023/4056; H01L 2023/4062; H01L 2023/4037
See application file for complete search history.

(56) References Cited

U.S. PATENT DOCUMENTS

| | | | | |
|---|---|---|---|---|
| 4,591,400 | A * | 5/1986 | Fradenburgh | B29C 33/48 156/80 |
| 4,819,720 | A | 4/1989 | Howard | |
| 5,506,032 | A | 4/1996 | Rowe | |
| 5,688,426 | A * | 11/1997 | Kirkwood | B64C 1/064 219/633 |
| 5,692,558 | A | 12/1997 | Hamilton et al. | |
| 5,794,888 | A * | 8/1998 | Lutzer | B64C 3/36 244/117 A |
| 6,375,120 | B1 * | 4/2002 | Wolnek | B32B 5/28 244/119 |
| 6,463,699 | B1 | 10/2002 | Bailey | E04C 3/005 138/115 |
| 6,863,980 | B2 * | 3/2005 | Misciagna | B32B 37/00 428/408 |
| 7,325,772 | B1 | 2/2008 | Hanewinkel, III et al. | |
| 8,640,469 | B2 | 2/2014 | Mackin | |
| 8,950,468 | B2 | 2/2015 | Blanding | |
| 9,422,060 | B2 | 8/2016 | Smith et al. | |
| 10,029,808 | B2 | 7/2018 | Blanding et al. | |
| 10,161,491 | B1 * | 12/2018 | Doman | F16H 25/2204 |
| 2004/0055248 | A1 * | 3/2004 | Grillos | B64C 1/12 52/783.1 |
| 2005/0247818 | A1 * | 11/2005 | Prichard | B64C 1/12 244/1 R |
| 2006/0032982 | A1 * | 2/2006 | Stephens | B64C 3/18 244/131 |
| 2006/0231233 | A1 | 10/2006 | Farid et al. | |
| 2008/0277526 | A1 | 11/2008 | Willdig et al. | |
| 2009/0288814 | A1 | 11/2009 | Stoia et al. | |
| 2010/0321891 | A1 | 12/2010 | Steenwyk et al. | |
| 2013/0048262 | A1 | 2/2013 | Ofoma et al. | |
| 2013/0187004 | A1 | 7/2013 | Caballero et al. | |
| 2014/0001309 | A1 | 1/2014 | Tieys et al. | |
| 2015/0191238 | A1 * | 7/2015 | Hucker | F28F 21/06 244/117 R |
| 2015/0246719 | A1 * | 9/2015 | Pelissier | B64C 1/12 244/120 |
| 2015/0266146 | A1 * | 9/2015 | Ofoma | H05K 7/20509 29/890.03 |
| 2016/0029518 | A1 * | 1/2016 | Dede | H05K 7/205 165/133 |
| 2016/0128227 | A1 * | 5/2016 | Gernert | H05K 7/20336 165/104.21 |
| 2016/0343467 | A1 * | 11/2016 | Wen | C23C 16/06 |
| 2016/0347464 | A1 * | 12/2016 | Seack | B64C 1/403 |
| 2016/0381832 | A1 * | 12/2016 | Hurbi | H01L 23/373 165/185 |
| 2017/0197701 | A1 * | 7/2017 | Gielda | B64C 3/36 |
| 2017/0241715 | A1 * | 8/2017 | Ota | F25B 39/00 |
| 2017/0247126 | A1 * | 8/2017 | Blanding | B64C 3/185 |
| 2017/0283263 | A1 * | 10/2017 | Humfeld | C23C 16/26 |
| 2017/0307308 | A1 * | 10/2017 | Baldwin | H01L 23/3733 |
| 2018/0281983 | A1 * | 10/2018 | Kamihara | B64C 1/00 |

FOREIGN PATENT DOCUMENTS

| | | |
|---|---|---|
| WO | WO2008140972 A1 | 11/2008 |
| WO | WO2016088470 A1 | 6/2016 |

OTHER PUBLICATIONS

Duston, et al., "Strength Enhancement and Application Development of Carbon Foam for Thermal Management Systems", pp. 1-9 (2004).
Ultramet; Refractory Open-Cell Foams: Carbon, Ceramic, and Metal; http://www.ultramet.com/refractoryopencells_thermalmanagement.html (2017).
Gallego, et al., "Carbon Foams for Thermal Management", Pergamon, pp. 1461-1466, Carbon 41 (2003).
Owens, A.T., "Thermal Management in Fiber-Reinforced Composite Applications", U.S. Army AMRDEC (2017).
Lin, et al., "Review on Graphite Foam as Thermal Material for Heat Exchangers", Energy End-Use Efficiency Issues (EEE), Department of Energy Sciences, Lund University (2011).
Spradling, "Carbon Foams", Advanced Materials and Processes, pp. 29-31, Nov. 2003.
European Patent Office; Extended European Search Report for Application No. 18165160.5 dated Sep. 3, 2018.

* cited by examiner

US 10,723,437 B2

SYSTEM FOR STRUCTURALLY INTEGRATED THERMAL MANAGEMENT FOR THIN WING AIRCRAFT CONTROL SURFACE ACTUATORS

FIELD OF THE DISCLOSURE

This disclosure relates generally to thermal management systems for thin wing or composite material wing aircraft. More particularly, this disclosure relates to systems for structurally integrating thermal management for advanced control surface actuators into thin and/or composite wing aircraft.

BACKGROUND

The recent trend in aircraft manufacturing is to use more composite material (i.e., carbon fiber reinforced polymer (CFRP)) and less metallic material to reduce the weight of the aircraft. However, composite material is not as good at conducting heat as metals. More specifically, the fibers in the composite material have relatively high thermal conductivity (e.g., carbon). However, the resin surrounding the fibers is not as thermally-conductive (e.g., a polymer), which lowers the overall thermal-conductivity of the composite material.

Another trend in aircraft manufacturing is the push for implementing More Electric Aircraft ("MEA") with more electrically powered subsystems, Electric Actuation Systems ("EAS"), and fewer pneumatic and hydraulic systems. EAS, such as control surface actuators in the wing, generate heat as they are operated. In contrast, for hydraulic actuators, generated heat is transferred to the hydraulic fluid, which is channeled to a heat exchanger to manage the heat generated in the wing. EAS have no such fluid, hydraulic or otherwise, to transfer heat away from the actuator. Accordingly, compared to metal wings that do efficiently transfer heat, within a composite wing, heat can build up and the composite material does not efficiently transfer the heat to a cooler location (i.e., ambient atmosphere and/or a wing fuel tank). The buildup of heat can damage the EAS, surrounding structures, or the like.

Some EAS have active cooling systems that include coolant conduits and heat exchangers. However, such active cooling systems use power and add weight to the aircraft.

SUMMARY

Disclosed embodiments include a thermal management system for transferring heat from a heat load including a composite structural member that supports a heat load source and a heat transfer member in thermal contact with the composite structural member, and in thermal contact with a heat sink. The system further includes at least one thermally-conductive first fastener, in thermal contact with the heat transfer member, that couples the heat load source to the composite structural member, and conducts heat from the heat load source into the heat transfer member, and the heat transfer member conducts heat from the thermally-conductive first fastener to the heat sink.

The heat sink may be ambient atmosphere and the system further includes a thermally-conductive second fastener, in thermal contact with the heat transfer member, and that couples a composite wing skin to the composite structural member, and the wing skin has at least one side exposed to the ambient atmosphere, and at least a portion of the thermally-conductive second fastener extends to the at least one side exposed to the ambient atmosphere.

The heat transfer member may be carbon foam material. In addition, the composite structural member has a first thermal conductivity coefficient, the heat transfer member has a second thermal conductivity coefficient that is higher than the first thermal conductivity coefficient, and the at least one thermally-conductive first fastener has a third thermal conductivity coefficient that is higher than the second thermal conductivity coefficient.

The heat load source may be an EAS. The composite wing skin may be fibers in a resin and the fibers are more thermally-conductive than the resin.

Disclosed embodiments also include a structurally integrated thermal management system for a composite aircraft wing, the system including a first composite wing skin, in thermal contact on an interior side with a heat transfer member, and exposed to ambient atmosphere on an exterior side, a composite wing spar having an interior cavity that contains a portion of the heat transfer member, a second composite wing skin, in thermal contact on an interior side with the heat transfer member, and exposed to ambient atmosphere on an exterior side, an EAS coupled to the composite wing spar by a thermally-conductive mount and at least one thermally-conductive first fastener that extends into the interior cavity and is in thermal contact with the heat transfer member, one or more thermally-conductive second fasteners that couple the first composite wing skin and the second composite wing skin to the composite wing spar, and thermally contact the heat transfer member, and a portion of the one or more thermally-conductive second fasteners extend through to the exterior side of the first composite wing skin, or the second composite wing skin.

The system may also include a stiffening member in contact with the composite wing spar and the interior side of the first composite wing skin, or the second composite wing skin. The stiffening member is configured to define one or more channels. The one or more channels contain a portion of the heat transfer member. The at least one thermally-conductive first fastener, or the at least one thermally-conductive second fastener may be formed of stainless steel.

The first composite wing skin, or the second composite wing skin, may be fibers in a resin. In some embodiments, the fibers may be glass or carbon.

Disclosed embodiments also include a composite wing spar including a first composite structural member having a base, a cap, and a web portion, a second composite structural member having a base, a cap, and a web portion, the web portion of the first composite structural member is positioned adjacent, and spaced apart from, the web portion of the second composite structural member to define a central cavity between the first composite structural member and the second composite structural member, and a thermally-conductive material positioned in at least a portion of the central cavity and extending to cover at least a portion of the base and the cap of the first composite structural member, and at least a portion of the base and cap of the second composite structural member.

Figure 1:
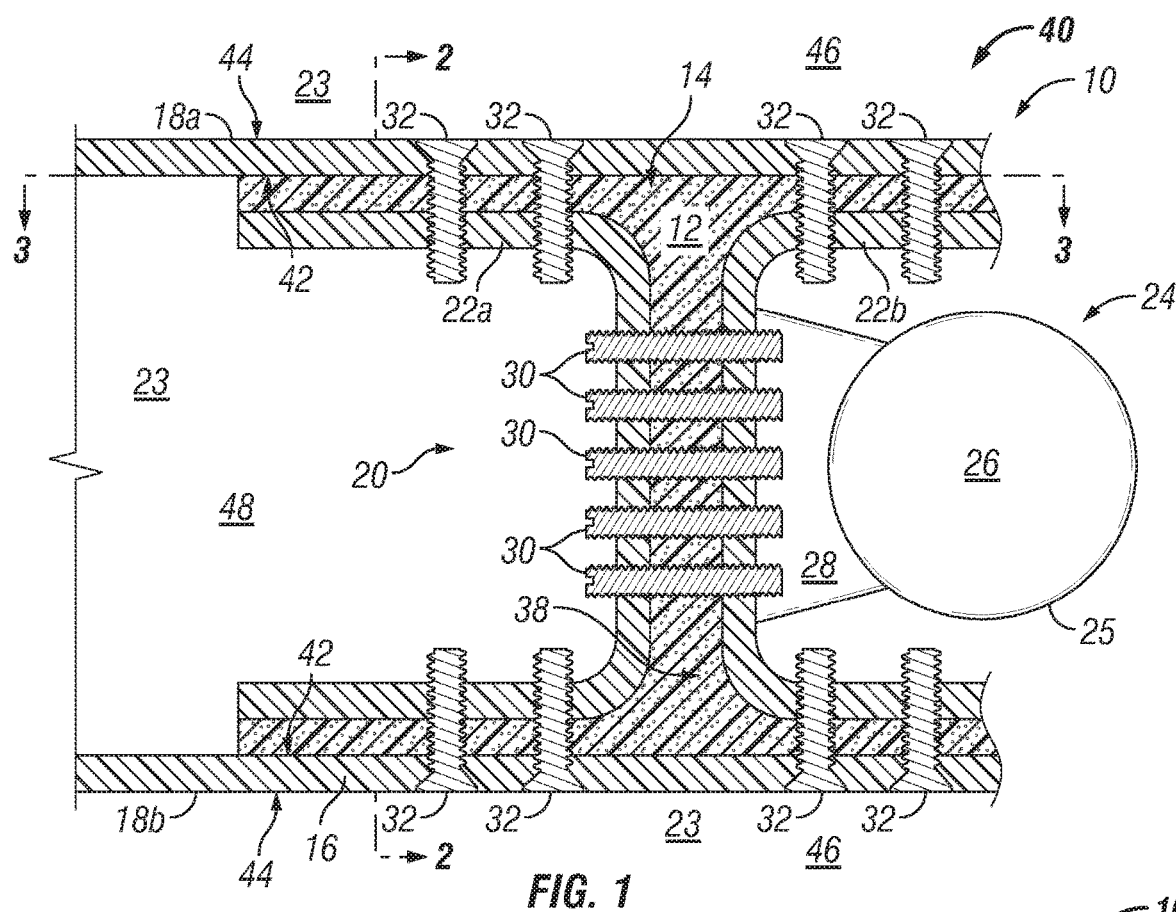
FIG. 1 is a cross-sectional schematic of a portion of structurally integrated thermal management system in accordance with disclosed embodiments.

While the disclosure is susceptible to various modifications and alternative forms, specific embodiments have been shown by way of example in the drawings and will be described in detail herein. However, it should be understood that the disclosure is not intended to be limited to the particular forms disclosed. Rather, the intention is to cover all modifications, equivalents and alternatives falling within the spirit and scope of the invention as defined by the appended claims.

DETAILED DESCRIPTION

The embodiments described herein provide an improved, lightweight system to manage heat loads caused by EAS and other electrical systems in composite aircraft components. The disclosed system recovers, and potentially improves upon, the heat conduction of metal structures while retaining the weight savings of composite structures. This is accomplished by the intimate integration of heat conduction paths into composite structures. More specifically, there is disclosed a composite stiffener assembly for an aircraft component (e.g., a spar assembly for a wing) that includes an inner, thermally-conductive material that can transfer heat from a heat load (e.g., an EAS) to a heat sink which includes ambient atmosphere, a wing tank, some other internal or external tank, a phase change material, some other location, or combinations of the foregoing. The thermally-conductive material has a higher heat conductivity than the surrounding composite material to create a thermal path to, at least, the aircraft skin. The thermal path enables heat to transfer from the heat load, through the thermally-conductive material to the wing skin, and from the exterior surface of the skin to the ambient atmosphere (which can be quite cold at altitude).

FIG. 1 is a front-view, cross-sectional schematic of a portion of structurally integrated thermal management system 10 in accordance with disclosed embodiments. As shown, system 10 includes a structural member 22, a heat transfer member 12, and at least one first fastener 30. The structural member 22 includes and/or is formed from a composite material. The heat transfer member 12 is in thermal contact with the structural member 22 and a heat sink 23. The first fastener(s) 30 includes and/or is formed from a thermally-conductive material. The first fastener(s) 30 is in thermal contact with the heat transfer member 12 and couples a heat load source 24 to the composite structural member 22. The first fastener(s) 30 conducts heat from the heat load source 24 into the heat transfer member 12, and the heat transfer member 12 conducts heat from the first fastener(s) 30 to a heat sink 23. The system 10 and its components are described in more detail herein.

The heat transfer member 12 is formed from the thermally-conductive material 14. The thermally-conductive material 14 is preferably a solid, although it need not be, that is not reactive with the composite material 16 (e.g., absent a galvanic barrier, aluminum and carbon fiber react with each other and are, thus, a less desirable combination). The heat transfer member 12 can be formed from a carbon foam, or other material. For example, heat transfer member 12 is formed of thermally-conductive materials such as metals, non-metals, pyrolytic graphite strips or straps, copper strips or straps, silver strips or straps, graphene, carbon nano tube straps or strips, or the like. Other materials for the heat transfer member 12 are a metallic foam, a microlattice, or the like. Embodiments employing a microlattice may also utilize a cooling fluid flowing through or around the microlattice to improve heat transfer performance.

The carbon foam used in or as heat transfer member 12 can be "graphitic" or "non-graphitic" and have higher thermal and electrical conductivity with a lower density than, for example, a metal. In one example where heat transfer member 12 is or includes a graphitic foam, the effective thermal conductivity of the graphitic foam is more than 150 W/(m-K), which is higher than the value of 2-26 W/(m-K) for aluminum. Likewise, the density of the graphitic foam in this example is 0.2-0.6 g/cm$^3$, which is approximately one-fifth the density of aluminum. Thus, where weight is a consideration, as it is in aircraft, the low density and high thermal conductivity of carbon foam is advantageous for use as or in heat transfer member 12.

As described above, the system 10 includes one or more structural members 22 that are formed from a composite material, such as CFRP. A wing spar 20 includes at least a structural member 22a, a second structural member 22b, and a thermally-conductive material 14. Each structural member 22a, 22b includes a web portion 222, a cap 224, and a base 226 (see, e.g., FIG. 2). The web portion 222 of the first structural member 22a is positioned adjacent to, and spaced apart from, the web portion 222 of the second structural member 22b to define a central cavity 38 between the first structural member 22a and the second structural member 22b. The thermally-conductive material 14 (e.g., the heat transfer member 12) is positioned in at least a portion of the central cavity 38. The thermally-conductive material 14 extends to cover at least a portion of the base 226 and the cap 224 of the first structural member 22a and to cover at least a portion of the base 226 and the cap 224 of the second structural member 22b.

A composite wing 40 for an aircraft includes a first composite wing skin 18a, the wing spar 20, a second composite wing skin 18b, an electric actuation system (EAS) 25, and one or more thermally-conductive second fasteners 32. The first wing skin 18a is in thermal contact on an interior side 42 with the heat transfer member 12 and is exposed to ambient atmosphere 46 on an exterior side 44. The wing spar 20 has the interior cavity 38 that contains a portion of the heat transfer member 12. The second wing skin 18b is in thermal contact on an interior side 42 with the heat transfer member 12 and is exposed to ambient atmosphere 46 on an exterior side 44. The EAS 25 is coupled to the wing spar 20 by a thermally-conductive mount 28 and at least one thermally-conductive first fastener 30 that extends into the interior cavity 38 of the spar 20. The EAS 25 is in thermal contact with the heat transfer member 12. The one or more thermally-conductive second fasteners 32 couple the first wing skin 18a and the second wing skin 18b to the composite wing spar 20 and thermally contact the heat transfer member 12. A portion of the one or more thermally-conductive second fasteners 32 extend through to the exterior side 44 of the first wing skin 18a or the second wing skin 18b.

For embodiments where system 10 is incorporated into a wing spar 20, as shown in FIG. 1, heat transfer member 12 extends throughout the wing spar 20 and is in thermal contact with the interior side 42 of wing skin 18. As also shown, the one or more structural members 22 are included in wing spar 20. In the exemplary embodiment shown in the figures, each structural member 22 has a cross-sectional shape with linear sections connected by partially arcuate corners (i.e., a "C-channel"), or the like. Alternatively, instead of two structural members 22, a single beam with a cross-sectional shape having generally rectangular, parallel base and cap portions separated by a generally perpendicular rectangular support (i.e., an "I beam") with a hollow interior, or the like shaped wing spar 20 may be used. Other structural members and shapes are also possible.

As disclosed herein, the system 10 is configured to manage the heat load generated by the heat load source 24, such as the EAS 25, or the like, mounted to an aircraft structural member (e.g., structural member(s) 22 forming the wing spar 20). As shown in FIG. 1, for embodiments where the heat load source 24 is an EAS 25, the system 10 also includes an electrically operated actuator 26 and a mount 28 that supports the actuator 26 in the desired position on the wing spar 20, or other structural member. Mount 28 is suitably shaped and formed of a suitable, thermally-conductive material to facilitate the transfer of heat away from the actuator 26. For example, if an outer surface of the EAS 25 is generally cylindrical, mount 28 is reciprocally curved so that the EAS 25 and the mount 28 make sufficient contact to efficiently transfer heat away from the EAS 25. Likewise, mount 28 is formed from thermally-conductive materials including: stainless steel, aluminum, metals, non-metals, pyrolytic graphite blocks, carbon foams, pyrolytic graphite strips or straps, copper blocks, strips, or straps, temperature sensitive hydro gels, phase change materials, thermally-conductive epoxy, thermally-conductive polymers, thermally-conductive pastes, or other thermally-conductive material. The particular material for mount 28 is selected based on, among other things, the desired strength, durability, and thermal conductivity for the mount 28.

System 10 also includes one or more first fasteners 30. The fasteners 30 are configured to further enhance the thermal path from the heat load 24 (e.g., an EAS 25) to the heat transfer member 12. More specifically, as shown, the first fasteners 30 extend through at least two composite components (e.g., through two structural members 22, or through a structural member 22 and the wing skin 18) and through the heat transfer member 12 between the composite components. First fasteners 30 are a metal, or other thermally-conductive material, and may vary in number and location. Accordingly, the heat from heat source 24, e.g., an EAS 25 or the like, is transferred along the first fasteners 30 into the heat transfer member 12 instead of through the relatively low thermally-conductive composite components (e.g., structural member 22 and wing skin 18). The first fasteners 30 also stiffen a vertical section of the structural member(s) 22 to prevent deformation of the vertical section of the structural member(s) 22.

The system 10 can further include at least one second fastener 32 formed from a thermally-conductive material. Second fasteners 32 couple the wing skin 18 to the heat transfer member 12 and the structural member(s) 22 (e.g., that form wing spar 20). Second fasteners 32 are also a metal or other thermally-conductive material and also vary in number and location. The second fasteners 32 not only bear a mechanical load, but also transfer heat from the heat transfer member 12 to the heat sink 23, such as the ambient atmosphere 46 (e.g., outside wing skin 18), a wing tank 48, and/or other suitable heat sink 23. The second fasteners 32 also provide a heat path to the carbon fibers of the composite skin 18. The carbon fibers generally have a thermal conductivity of approximately 21-180 W/(m-K) and heat will be conducted along the fibers and spread out to large parts of the skin 18. In this manner, the heat is distributed to an area much larger (e.g., hundreds or thousands times larger) than the area of second fastener 32 heads, which facilitates the heat conduction to the atmosphere 46, or other surrounding environment, in that the heat has been distributed to large area.

Figure 2:
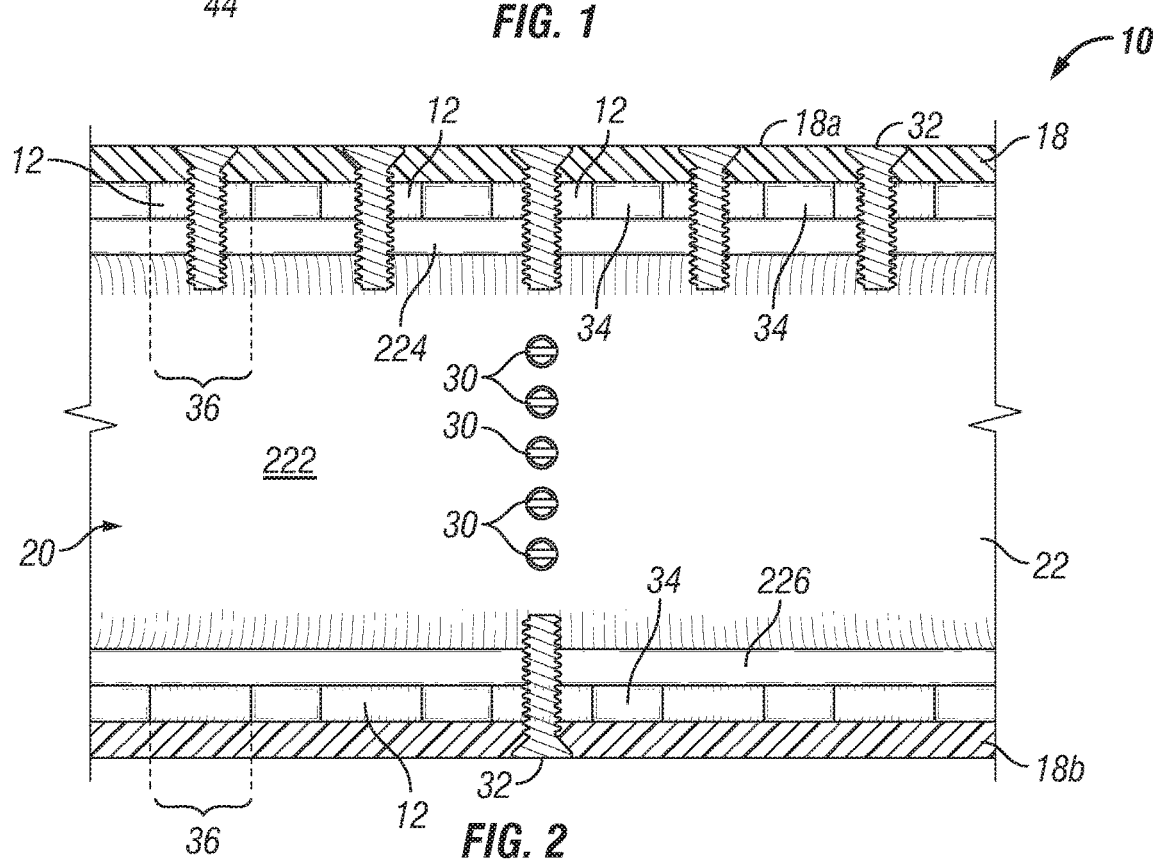
FIG. 2 is a side-view, cross-sectional schematic along line 2-2 of FIG. 1.
Figure 3:
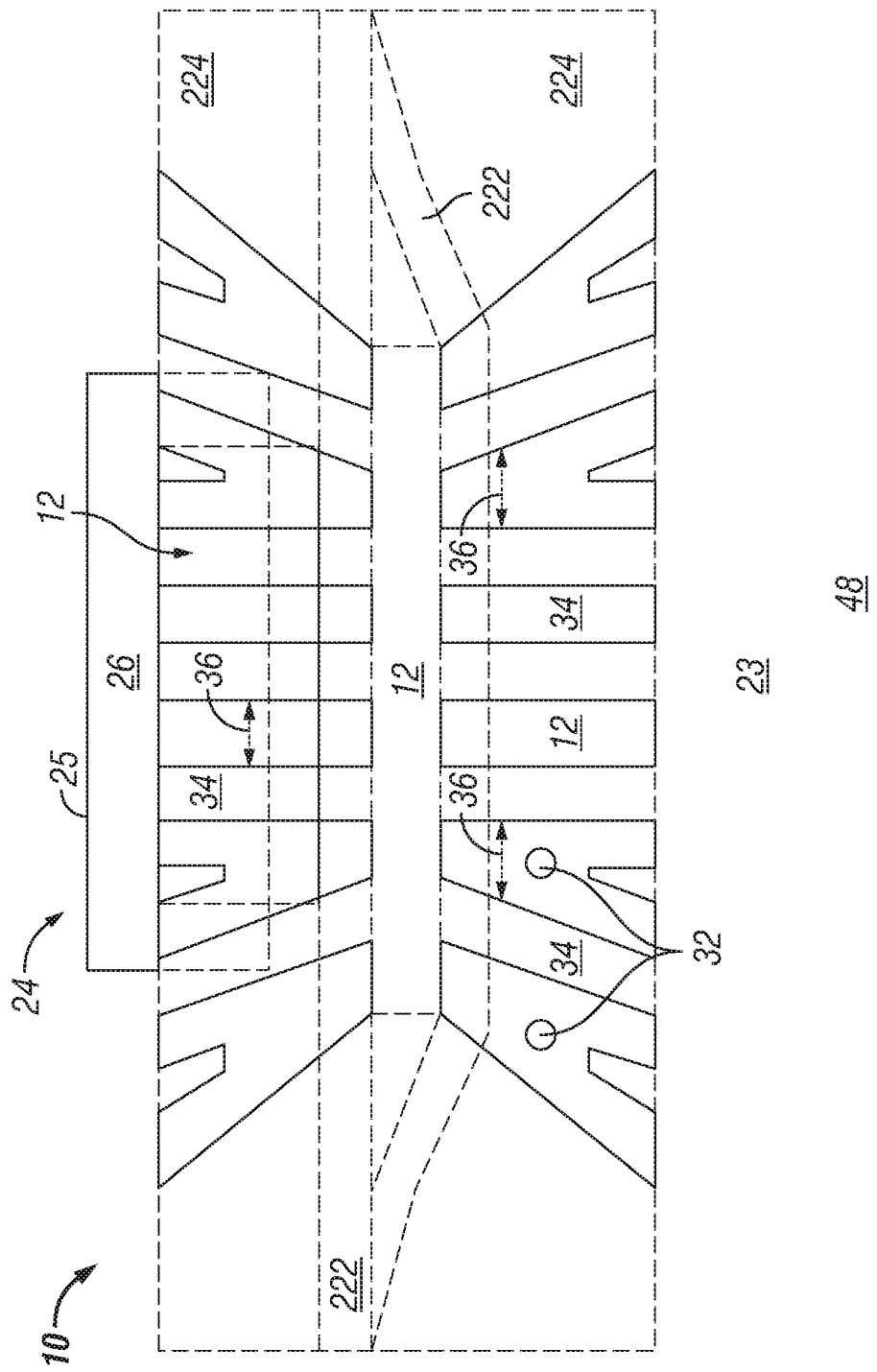
FIG. 3 is a top-view, cross-sectional schematic along line 3-3 of FIG. 1.

The first fasteners 30 and second fasteners 32 are sized based on the anticipated heat load and the thermal conductivity of the composite material (e.g., wing skin 18, wing spar 20, or other structural members). In addition, the first fasteners 30 and second fasteners 32 also serve a structural, load-bearing function and are sized according to the load to be borne. Overall, to manage the heat produced by an EAS 25, or other heat generating device, coupled to the composite assembly, the thermal path is generally from the actuator 26, along an actuator mount 28, into the first fasteners 30, then into the heat transfer member 12 (and/or a wing tank), from the heat transfer member 12 into second fasteners 32 (and/or the composite wing skin 18), and ultimately to the heat sink 23 (e.g., the ambient atmosphere 46 on the other side of the wing skin 18). In FIGS. 1-3, the fasteners 30, 32, are illustrated schematically and include any suitable fastener for the chosen application. For example, fasteners 30, 32 include: through-bolts with accompanying nuts (not shown), rivets, flush-mount bolts (e.g., for wing skin 18 fastening), or the like.

For embodiments using a heat transfer member 12 comprising a carbon foam, which typically does not have particularly high mechanical strength, to strengthen the structural assembly (e.g., wing spar 20), stiffening members 34, or the like, are positioned between the composite wing skin 18 and the structural member 22 (e.g., that form wing spar 20).

FIG. 2 is a side-view, cross-sectional schematic along 2-2 of FIG. 1 that illustrates an embodiment including stiffening members 34. Channels 36 are defined between stiffening members 34, and the heat transfer member 12 extends through the channels 36. As shown, the second fasteners 32 are coupled through the heat transfer member 12, not through stiffening members 34, in order to, among other things, facilitate the heat transfer. Embodiments of stiffening members 34 include CFRP material, thermally-conductive metals, or combinations of the foregoing that add desired structural strength without adding undesired weight to the aircraft. As shown in FIG. 2, wing spar 20 includes a web 222, a cap 224, and a base 226. The web portion 222, cap 224, and base 226 are formed by structural member(s) 22, as described above. Stiffening members 34 are placed between cap 224 and wing skin 18 on the top side, and base 226 and wing skin 18 on the bottom side. In FIG. 2, only a few representative first fasteners 30 and only a few representative second fasteners 32 are shown for illustrative purposes. In practice, there may be more than one row and/or column of first fasteners 30 in the web portion 222, and there would be more than one second fastener 32 in the bottom wing skin 18b.

FIG. 3 is a top-view, cross-sectional schematic along 3-3 of FIG. 1 with the top wing skin 18 removed for clarity. As shown in this view, channels 36 vary in size, shape, width, and length as is desired. Heat transfer member 12 fills the various channels 36 as disclosed herein. Stiffening members 34 are also sized and distributed as disclosed herein to add structural strength to the thermal management system 10. Again, in FIG. 3, first fasteners 30 are not illustrated for clarity, and a few exemplary second fasteners 32 are shown providing a heat path from heat transfer member 12 to outer wing skin (not shown in FIG. 3).

Although various embodiments have been shown and described, the present disclosure is not so limited and will be understood to include all such modifications and variations are would be apparent to one skilled in the art.

What is claimed is:

1. A thermal management system for transferring heat from a heat load source, the system comprising:
   a first composite structural member that supports the heat load source;
   a second composite structural member;
   a heat transfer member, which is positioned between the first composite structural member and the second composite structural member, is in thermal contact with at least the first composite structural member, and is in thermal contact with a heat sink;
   at least one thermally conductive first fastener that connects the first composite structural member to the second composite structural member, is in thermal contact with the heat transfer member, that couples the heat load source to the first composite structural member, and that conducts heat from the heat load source into the heat transfer member; and wherein
   the heat transfer member conducts heat from the thermally conductive first fastener to the heat sink.

2. The system of claim 1 wherein the heat transfer member comprises a pyrolytic graphite strip or strap.

3. The system of claim 1 wherein the heat transfer member further comprises:
   carbon foam material.

4. The system of claim 1 wherein the first composite structural member has a first thermal conductivity coefficient, the heat transfer member has a second thermal conductivity coefficient that is higher than the first thermal conductivity coefficient, and the at least one thermally conductive first fastener has a third thermal conductivity coefficient that is higher than the second thermal conductivity coefficient.

5. The system of claim 1 wherein the heat load source further comprises:
   an electric actuation system (EAS).

6. The system of claim 1 wherein the at least one thermally conductive first fastener comprises stainless steel.

7. The system of claim 1 wherein the heat transfer member comprises a metallic foam.

8. The system of claim 1 wherein the heat transfer member comprises a graphene material.

9. The system of claim 1 wherein the heat transfer member comprises a carbon nano tube strip or strap.

10. The system of claim 1 wherein the heat transfer member comprises a metallic strip or strap.

11. The system of claim 10 wherein the metallic strip or strap comprises copper.

12. The system of claim 1 wherein the heat sink comprises ambient atmosphere and the system further comprises:
    a thermally conductive second fastener, in thermal contact with the heat transfer member, and that couples a composite wing skin to at least the first composite structural member; and
    wherein the composite wing skin has at least one side exposed to the ambient atmosphere, and at least a portion of the thermally-conductive second fastener extends to the at least one side exposed to the ambient atmosphere.

13. The system of claim 12 wherein the composite wing skin further comprises:
    fibers in a resin and wherein the fibers are more thermally conductive than the resin.

14. The system of claim 12 wherein the at least one thermally conductive first fastener, or the thermally-conductive second fastener comprises stainless steel.

15. The system of claim 12 wherein the composite wing skin comprises fibers in a resin.

16. The system of claim 15 wherein the fibers comprise glass or carbon.

17. The system of claim 12 further comprising:
    a stiffening member in contact with at least the first composite structural member and with an interior side of the composite wing skin.

18. The system of claim 17 wherein the stiffening member defines one or more channels.

19. The system of claim 18 wherein the one or more channels contain a portion of the heat transfer member.

20. The system of claim 19 wherein the heat transfer member comprises carbon foam material.

* * * * *